US007744023B2

(12) United States Patent
Park et al.

(10) Patent No.: US 7,744,023 B2
(45) Date of Patent: Jun. 29, 2010

(54) METHOD FOR PREPARING BLACK PHOSPHORUS OR BLACK PHOSPHORUS-CARBON COMPOSITE, LITHIUM RECHARGEABLE BATTERY COMPRISING THE PREPARED BLACK PHOSPHORUS OR BLACK PHOSPHORUS-CARBON COMPOSITE AND METHOD FOR USING THE RECHARGEABLE BATTERY

(75) Inventors: Cheol-Min Park, Daegu (KR); Hun-Joon Shon, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 280 days.

(21) Appl. No.: 11/835,710

(22) Filed: Aug. 8, 2007

(65) Prior Publication Data

US 2008/0038626 A1    Feb. 14, 2008

(30) Foreign Application Priority Data

Aug. 8, 2006    (KR) .................... 10-2006-0074819

(51) Int. Cl.
B02C 19/00    (2006.01)
(52) U.S. Cl. .......................................... 241/22; 241/30

(58) Field of Classification Search ................. 423/322; 429/209; 241/30, 172, 22
See application file for complete search history.

(56) References Cited

U.S. PATENT DOCUMENTS 2,200,743 A * 5/1940 Hardy ........................ 148/240
6,110,438 A   8/2000 Baillargeon et al.

FOREIGN PATENT DOCUMENTS

JP         58-184268 A     10/1983
JP         63-8292 A        1/1988
KR    10-2006-0101508 A     9/2006

OTHER PUBLICATIONS

Cheol-Min Park et al., "Enhancement of the rate capability and cyclability of am MG-C composite electrode for Li secondary batteries", Journal of Power Sources 158 (2006) 1451-1455.

* cited by examiner

Primary Examiner—Mark Rosenbaum
(74) Attorney, Agent, or Firm—Browdy and Neimark, PLLC

(57) ABSTRACT

Disclosed is black phosphorus or black phosphorus-carbon composite, which is very suitable for an anode material of lithium rechargeable battery. The black phosphorus or black phosphorus-carbon composite is prepared by using high energy ball-milling, which is easy and efficient way in transforming amorphous red phosphorus into orthorhombic black phosphorus at ambient temperature and pressure.

3 Claims, 3 Drawing Sheets

METHOD FOR PREPARING BLACK PHOSPHORUS OR BLACK PHOSPHORUS-CARBON COMPOSITE, LITHIUM RECHARGEABLE BATTERY COMPRISING THE PREPARED BLACK PHOSPHORUS OR BLACK PHOSPHORUS-CARBON COMPOSITE AND METHOD FOR USING THE RECHARGEABLE BATTERY

BACKGROUND OF THE INVENTION

1. Field of the Invention

The invention relates to a method for preparing black phosphorus or black phosphorus-carbon composite, lithium rechargeable battery comprising the prepared black phosphorus or black phosphorus-carbon composite and method for using the rechargeable battery.

2. Description of the Related Art

Lithium ion rechargeable batteries have been used as portable power sources for a wide variety of electronic devices such as cellular phones, notebook computers and camcorders. The rechargeable batteries have lithium as its anode material and shows the very excellent performance since lithium itself has such a high energy density of 3860 mAh/g. However, when using the lithium as the anode material of the rechargeable batteries, there occurs a problem of stability reduction of the rechargeable batteries during charge. Further, there occurs a problem of low charge and discharge efficiency.

In order to solve the problems, researches on the lithium alloy has been carried out. The lithium alloy has higher energy density and larger charge and discharge capacity per weight or per volume than those of the carbon-based anode material. However, the lithium alloy still suffer from poor capacity retention since a large volume change occurs during the charge and discharge, which cause the break of the active materials and the decrease of capacity during the cycle of the battery.

Intensive researches on the silicone-based composite also have been carried out. However, such technique using silicone-based composite as the anode material of the rechargeable batteries has a problem that there is no improvement in its charge and discharge characteristics as well as its cycle characteristics even though there is an increase of the capacity during the initial cycles of the batteries.

Meanwhile, phosphorus, which is an element of the fifth group in the periodic table, has a large theoretical capacity of 2595 mAh/g so as that it can be used suitably as the anode materials of the rechargeable batteries. Phosphorus has three main allotropes i.e. white, red and black. Among these several modifications of allotropes, black phosphorus is thermodynamically the most stable, insoluble in most solvents, practically non-flammable, and chemically the least reactive form and exists in three known crystalline modifications (orthorhombic, rhombohedral and simple cubic), as well as in an amorphous form.

Since orthorhombic black phosphorus was obtained from the white one at 200° C. and 1.2 GPa in the prior art, many studies designed to synthesize black phosphorus have been carried out. However, the basic concept of a high temperature and high pressure being required in the synthesis has not been changed, and to this end it still remains difficult and inefficient to synthesize black phosphorus and to apply it commercially.

SUMMARY OF THE INVENTION

Accordingly, an object of the invention is to provide a method for preparing a black phosphorus or black phosphorus-carbon composite efficiently and simply even at ambient temperature and pressure without any complex and inefficient heat treating at a high temperature and high pressure.

Another object of the invention is to provide a black phosphorus or black phosphorus-carbon composite having a good crystallinity, stability and electrical conductance.

Another object of the invention is to provide a lithium rechargeable battery and method for using the lithium rechargeable battery, wherein the capacity and the cycles of the lithium rechargeable battery is highly improved by means of changing the conventional anode materials into the black phosphorus or black phosphorus-carbon composite.

In order to accomplish the above object, there is provided a method for preparing black phosphorus comprising the steps of: providing amorphous red phosphorus among the allotropes of phosphorus (S1-1) and high energy ball-milling the red phosphorus so as to transform the red phosphorus into the crystalline black phosphorus (S2-1).

In order to accomplish the above object, there is provided a method for preparing black phosphorus-carbon composite comprising the steps of: mixing amorphous red phosphorus among the allotropes of phosphorus with carbon-based powder (S1-2) and high energy ball-milling the mixture so as to transform the mixture into composite of the crystalline black phosphorus and carbon (S2-1).

According to an embodiment of the invention, in the step of S1-2, the red phosphorus is comprised in an amount of 20 wt % or more and less than 100 wt %, and the carbon-based powder is comprised in an amount of more than 0 wt % and 80 wt % or less.

In order to accomplish the above object, there is provided a lithium rechargeable battery, wherein black phosphorus or black phosphorus-carbon composite is used for an anode material of the rechargeable battery.

In order to accomplish the above object, there is provided a method for using a lithium rechargeable battery, wherein black phosphorus or black phosphorus-carbon composite is used for an anode material of the rechargeable battery, and the reaction potential of the lithium rechargeable battery is determined to be from the reaction potential in which the LiP phase is formed to the reaction potential in which the P phase is formed at the differential capacity graph of the first cycle.

DETAILED DESCRIPTION OF THE PREFERRED EXAMPLES

Figure 1A:
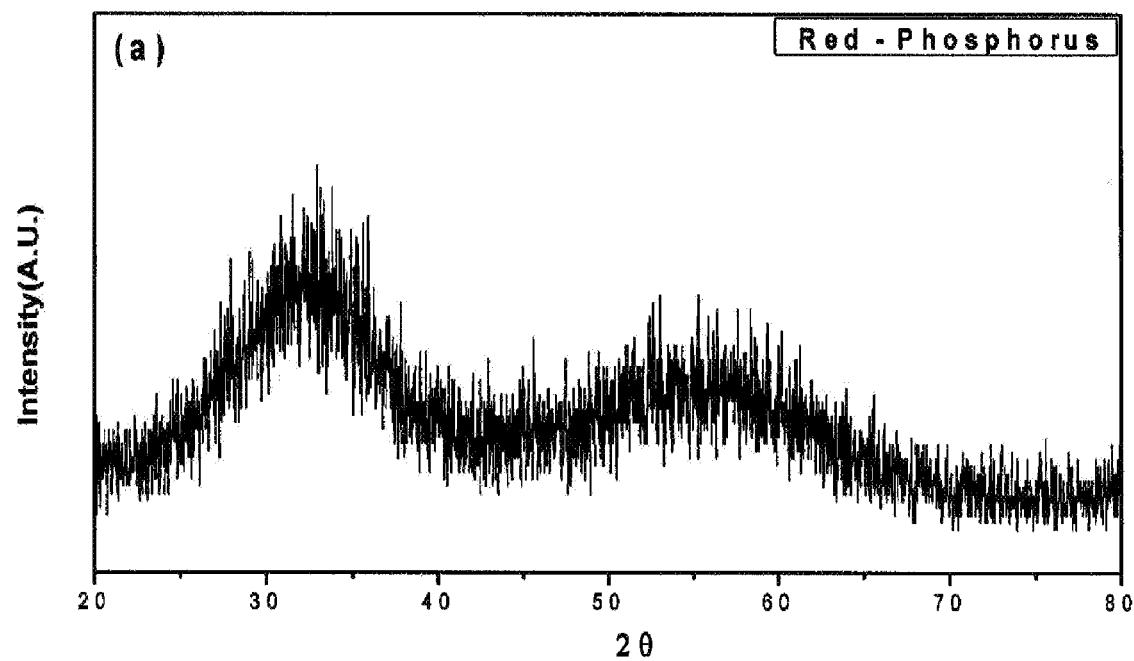
FIG. 1 is X-ray diffraction patterns of the black phosphorus of the example 1, black phosphorus-carbon composite of the example 2 and the red phosphorus of the comparative example.

Hereinafter, the present invention will be described in detail with reference to the drawings.

The inventors found out that orthorhombic black phosphorus, which exhibits a layer structure similar to that of graphite, can be used suitably as an anode material for lithium rechargeable batteries. Further, the inventors developed a simple and efficient method of transforming commercially available amorphous red phosphorus into orthorhombic black phosphorus using a high energy mechanical milling (HEMM) technique at ambient temperature and pressure. Generally, it is known that the temperature during HEMM can rise above 200° C. and the pressure generated can be of the order of 6 GPa. These conditions are sufficient to transform red phosphorus into the black phosphorus phase at ambient temperature and pressure.

Therefore, according to the invention, there is no need to perform conventional heat treating method at a high temperature and high pressure to obtain black phosphorus and black phosphorus-carbon composite.

In advance, the amorphous red phosphorus which is an allotrope of the phosphorus and commercially available is provided in order to prepare the black phosphorus (S1-1). The red phosphorus is put into the cylindrical vial with a ball and then mechanical synthesis is carried out with its rotation velocity of 300 times per minute or more using the generally known high energy ball-milling devices (S2-1). The exemplary ratio of the ball to the powder is 16~24:1, and the ball-milling is preferably carried out in a glove box having Ar atmosphere in order to repress the oxygen and water as much as possible.

Meanwhile, in order to prepare the black phosphorus-carbon composite, the red phosphorus and the carbon-based powder [For example, Acetylene Black, Super P Black, Carbon Black, Denka Black, Activated Carbon, Hard Carbon, Soft Carbon, Graphite Carbon, etc.] are provided (S1-2).

When mixing the powder, it is preferable that the red phosphorus is mixed in an amount of 20 wt % or more and less than 100 wt % and the carbon-based powder is mixed in an amount of more than 0 wt % and 80 wt % or less.

If the red phosphorus is contained less than 20 wt %, i.e. the carbon-based powder is contained over 80 wt %, the carbon can be over ball-milled so that the charge and discharge capacity at the first cycle as well as the efficiency would be lowered and to this end the overall capacity and efficiency would be lowered.

The prepared mixture is put into the cylindrical vial with a ball and then the mechanical synthesis is carried out with a rotation velocity of 300 times or more per minute using the general high energy ball-milling devices (S2-2). Herein, the ratio of the ball to the powder is maintained to be 16~24:1. The exemplary ratio of the ball to the powder is 16~24:1, and the ball-milling is preferably carried out in a glove box having Ar atmosphere in order to repress the oxygen and water as much as possible.

As for the ball-milling devices by which a mechanical synthesis method providing high energy is carried out, all kinds of ball-milling devices such as a vibrotary-mill, z-mill, planetary ball-mill, attrition-mill, etc. which are used for high energy ball-milling at present can be used.

The prepared black phosphorus and black phosphorus-carbon composite are especially suitable for the anode material of the lithium rechargeable battery since they have structural characteristics such as improved crystallinity.

According to the invention, the conductive materials such as carbon and metal can be further used with the black phosphorus and black phosphorus-carbon composite in order to increase the electronic contact between the particles themselves and between the current collector and particles The black phosphorus-carbon composite also has good electrical contact so that repetitive charge and discharge of the lithium ion becomes possible. Accordingly, the battery comes to have larger capacity than the theoretical capacity of the commercial graphite and the characteristic of its cycles become very excellent.

Meanwhile, it is preferable to control the potential range of the battery for obtaining stable cycles by means of charge and discharge for many cycles and also by maintaining large capacity.

Especially, controlling the reaction potential to be from the reaction potential wherein the LiP phase is formed to the reaction potential wherein the P phase is formed at the differential capacity plot of the first cycle, the crystalline structure becomes stable and to this end stable cycles can be obtained.

Hereinafter, experiments regarding the examples and comparison examples will be further described.

EXAMPLE 1

Preparation of Black Phosphorus

Commercially available Red Phosphorus powder (High Purity Chemicals, >99%, average size: 75 μm) and stainless steel ball (diameter: ⅜") were put into a hardened steel cylindrical vial (diameter: 5.5 cm, height: 9 cm) with a ball-to-powder ratio of 20:1, and the HEMM process was conducted with a rotation velocity of 600 times per minute under an Ar atmosphere in a glove box for 12 hours, thereby transforming the amorphous red phosphorus to crystalline orthorhombic black phosphorus.

EXAMPLE 2

Preparation of Black Phosphorus-Carbon Composite

Commercially available Red Phosphorus powder (High Purity Chemicals, >99%, average size: 75 μm) and Carbon (Super P) were mixed. The composition of Red Phosphorus to Carbon was made to be 70 wt % to 30 wt %. Then, the mixture and stainless steel ball (diameter: ⅜") were put into a hardened steel cylindrical vial (diameter: 5.5 cm, height: 9 cm) with a ball-to-powder ratio of 20:1, and the HEMM process was conducted with a rotation velocity of 600 times per minute under an Ar atmosphere in a glove box for 12 hours, thereby transforming the amorphous red phosphorus-carbon composite to crystalline orthorhombic black phosphorus-carbon composite.

Figure 1B:
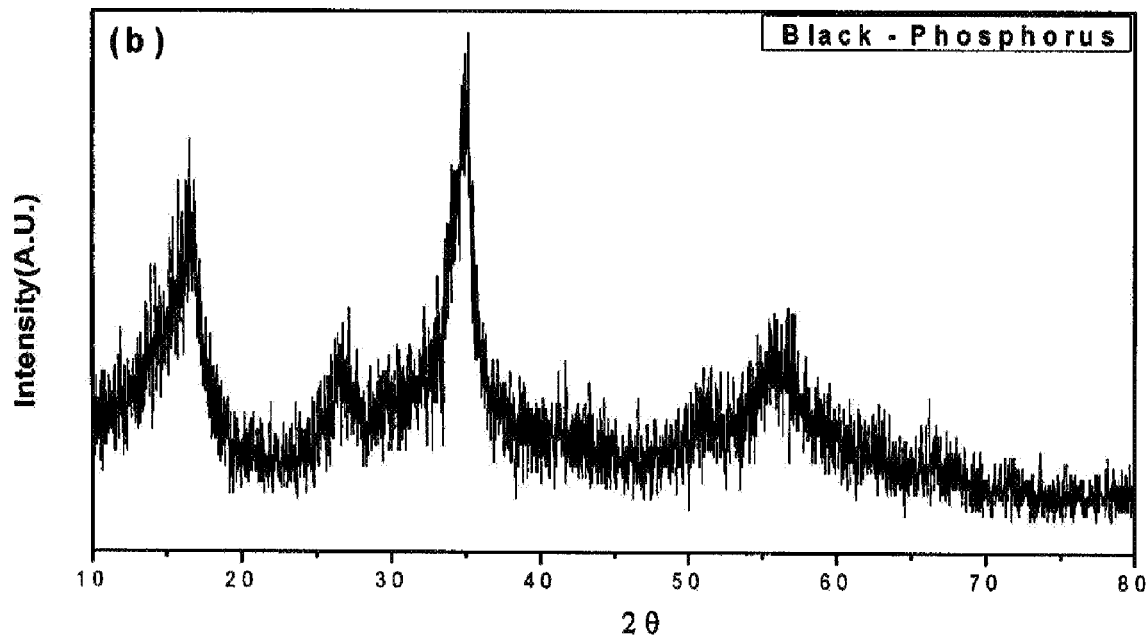
Figure 1C:
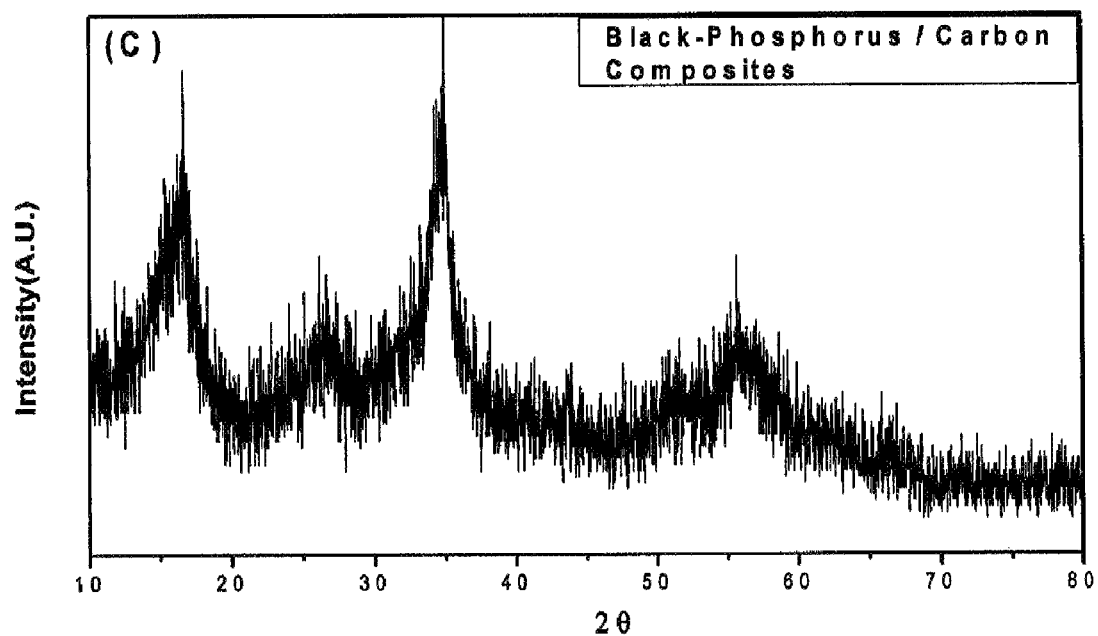

FIG. 1 is X-ray diffraction patterns. FIG. 1a is X-ray diffraction pattern of the amorphous red phosphorus which is a comparative example. FIG. 1b is X-ray diffraction pattern showing that black phosphorus has been synthesized. FIG. 1c is X-ray diffraction pattern showing that black phosphorus-carbon composite has been synthesized.

Figure 2:
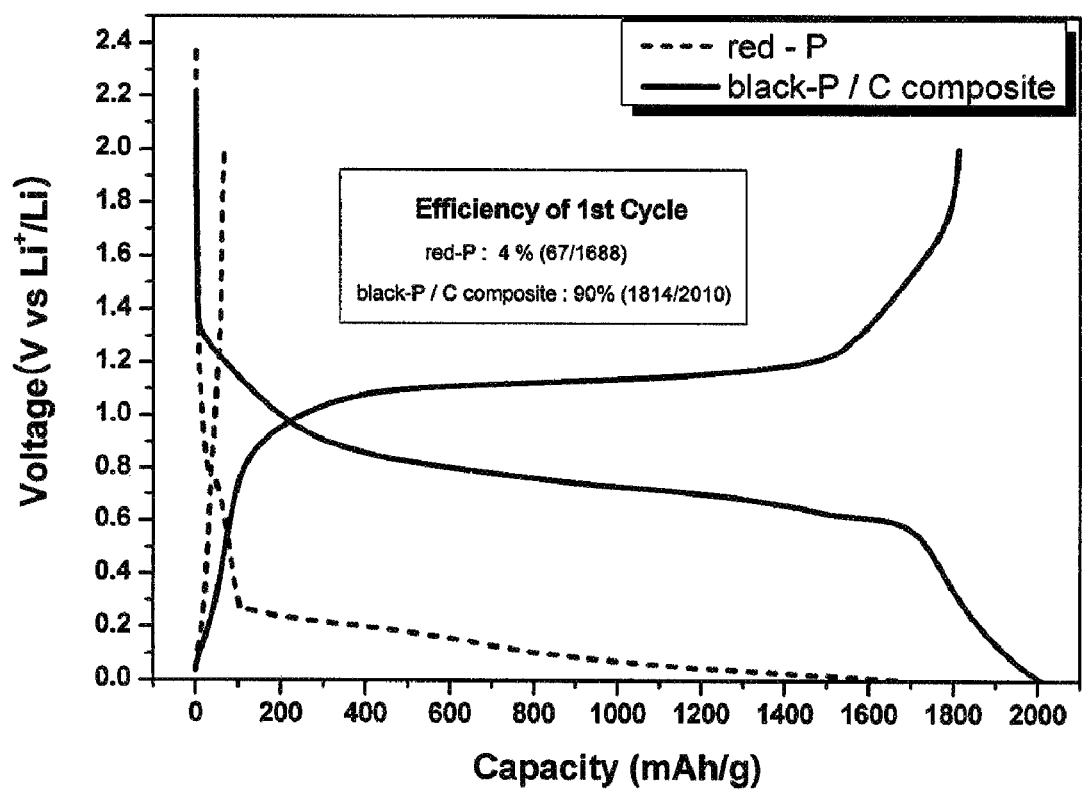
FIG. 2 is a graph showing the charge and discharge behavior at the first cycle of the lithium rechargeable battery using the black phosphorus-carbon composite of the example 2 and red phosphorus of the comparative example respectively as its anode active material.

FIG. 2 is a graph showing the charge and discharge behavior at the first cycle of the lithium rechargeable battery using the black phosphorus-carbon composite of the example 2 and red phosphorus of the comparative example respectively as an anode active material.

As FIG. 2 shows, with the amorphous red phosphorus, it is possible to store lithium during the charge but it is impossible to eliminate lithium during the discharge. Further, the charge and discharge efficiency of the first cycle was below 5%. To the contrast, with the black phosphorus-carbon composite, repetitive charge and discharge of lithium at the first cycle is possible. Further, its charge and discharge efficiency at the first cycle was about 90%, which means that the black phosphorus is more suitable than any other conventional materials for anode material of the lithium rechargeable battery.

Figure 3:
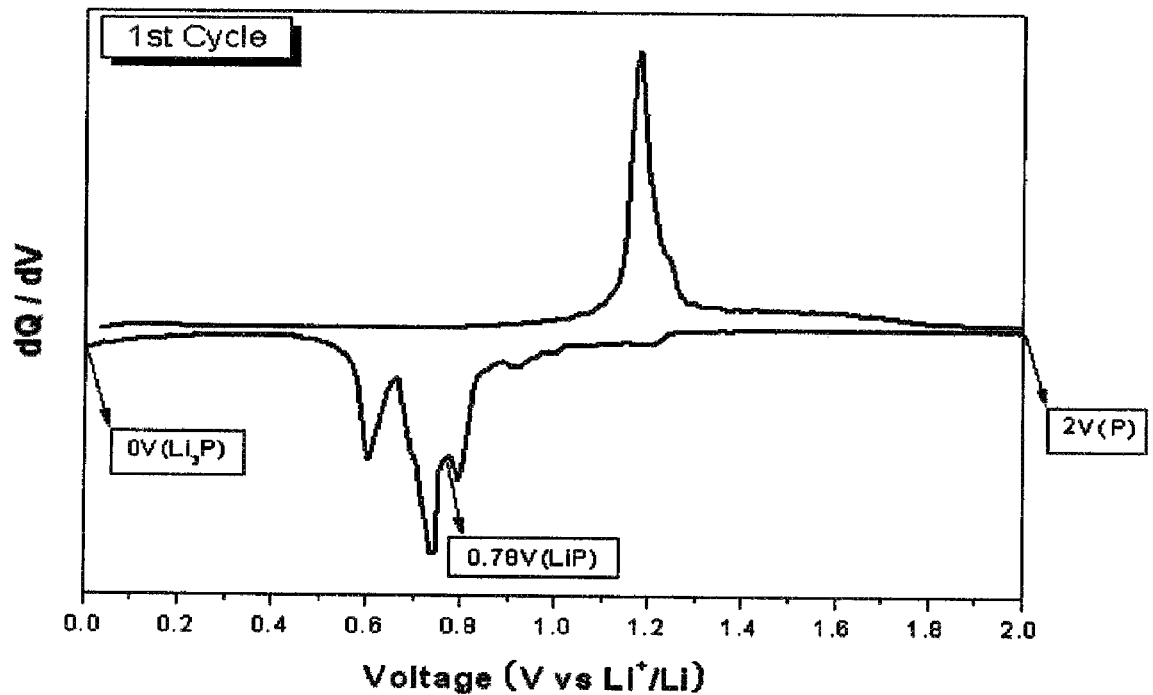
FIG. 3 is a differential capacity plot wherein the voltage is differentiated with the capacity for specific investigation of the charge and discharge behavior of the black phosphorus-carbon composite of the example 2 and red phosphorus of the comparative example at the first cycle of the lithium rechargeable battery.

FIG. 3 is a differential capacity plot wherein the voltage is differentiated with the capacity for specific investigation of the charge and discharge behavior of the black phosphorus-carbon composite of the example 2 and red phosphorus of the comparative example at the first cycle of the battery.

FIG. 3 shows that LiP phase was formed at 0.78 V As the voltage potential becomes lower, $Li_3P$ was finally formed. Further, P phase was formed at 2 V. The specific reaction potential wherein the respective phases are formed can be different according to how to assemble the battery and what to use as an electrolyte.

Figure 4:
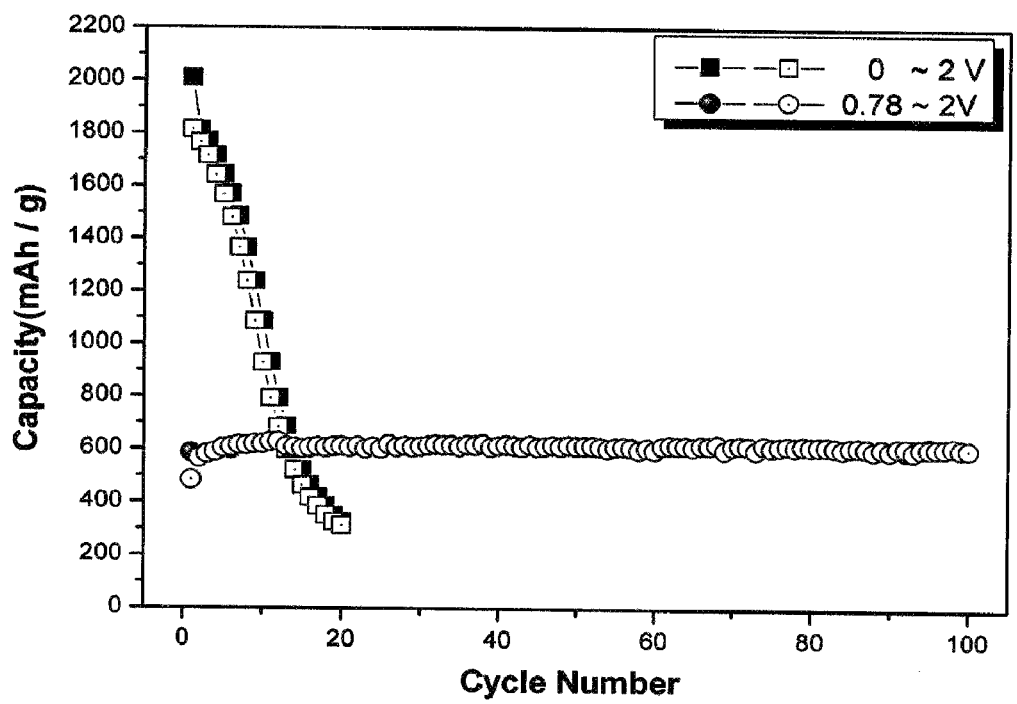
FIG. 4 is a graph showing the cycle characteristic data for the rechargeable battery using the black phosphorus-carbon composite as its anode material.

FIG. 4 is a graph showing the charge and discharge cycle characteristic data of the two potential regions. One is the potential region (0.78~2 V) which is from the potential wherein LiP phase is formed to the potential wherein P phase is formed and the other is the potential region (0~2 V) which is from the potential wherein $Li_3P$ phase is formed to the potential wherein P phase is formed.

As FIG. 4 shows, in case of the potential range which is from 0.78 V wherein the LiP phase is formed to 2 V wherein the P phase is formed, very stable cycles of 100 cycles or more was obtained while maintaining such a large capacity of 600 mAh/g or more.

According to the invention, compared to the conventional method which is not easy and efficient to perform due to its high temperature and high pressure, the black phosphorus or black phosphorus-carbon composite can be easily and efficiently obtained from the red phosphorus or red phosphorus-carbon composite even at an ambient temperature and pressure.

Furthermore, the black phosphorus or black phosphorus-carbon composite have a good crystallinity, stability, electric conductivity and to this end are very suitable for an anode material of lithium rechargeable battery, As well, the black phosphorus or black phosphorus-carbon composite is very helpful to obtain the mechanical stability of the lithium rechargeable battery and to improve the capacity and cycles since they make it possible to limit the potential and to this end to minimize the break of the anode materials which is due to the volume change of the anode materials occurring during the charge and discharge of the lithium rechargeable battery. Moreover, excellent cyclic performance can be obtained, by carefully controlling a voltage range, which also prohibits the formation of metallic lithium.

Due to said characteristics of the black phosphorus or black phosphorus-carbon composite, the black phosphorus or black phosphorus-carbon composite also can be applied to other kinds of rechargeable batteries such as Magnesium rechargeable batteries etc. as well as the lithium rechargeable battery and makes it possible to obtain improved capacities and long-term cycles also in such other kinds of rechargeable batteries.

What is claimed is:

1. A method for preparing black phosphorus comprising:
   providing amorphous red phosphorus among the allotropes of phosphorus; and
   high energy ball-milling the red phosphorus so as to transform the red phosphorus into the crystalline black phosphorus.

2. A method for preparing a black phosphorus-carbon composite comprising:
   mixing amorphous red phosphorus among the allotropes of phosphorus with carbon-based powder; and
   high energy ball-milling the mixture so as to transform the mixture into a composite of the crystalline black phosphorus and carbon.

3. The method according to claim 2, wherein the red phosphorus is at least 20 wt % of the mixture, and the carbon-based powder comprises up to 80 wt % of the mixture.

* * * * *